(12) United States Patent
Alpert et al.

(10) Patent No.: US 7,991,762 B1
(45) Date of Patent: Aug. 2, 2011

(54) MANAGING URLS

(75) Inventors: Jesse L. Alpert, Albany, CA (US);
Praveen K. Tammana, Sunnyvale, CA (US); Yair Kurzion, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/410,440

(22) Filed: Mar. 24, 2009

Related U.S. Application Data

(63) Continuation of application No. 11/166,786, filed on Jun. 24, 2005, now Pat. No. 7,509,315.

(51) Int. Cl.
*G06F 17/30* (2006.01)

(52) U.S. Cl. .. 707/709; 707/692; 707/696; 707/E17.123

(58) Field of Classification Search ............. 707/709, 707/713, 692, 696
See application file for complete search history.

(56) References Cited

U.S. PATENT DOCUMENTS

| | | | |
|---|---|---|---|
| 5,898,836 A | 4/1999 | Freivald et al. | |
| 6,012,087 A | 1/2000 | Freivald et al. | |
| 6,219,818 B1 | 4/2001 | Freivald et al. | |
| 6,285,999 B1 | 9/2001 | Page | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,463,430 B1 | 10/2002 | Brady et al. | |
| 6,547,829 B1 | 4/2003 | Meyerzon et al. | |
| 6,594,662 B1 | 7/2003 | Sieffert et al. | |
| 6,631,369 B1 | 10/2003 | Meyerzon et al. | |
| 6,638,314 B1 | 10/2003 | Meyerzon et al. | |
| 6,701,350 B1 | 3/2004 | Mitchell | |
| 6,751,612 B1 | 6/2004 | Schuetze et al. | |
| 6,763,362 B2 | 7/2004 | McKeeth | |
| 7,080,073 B1 | 7/2006 | Jiang et al. | |
| 7,171,619 B1 | 1/2007 | Bianco | |
| 7,257,594 B2 | 8/2007 | Tamboli et al. | |
| 7,299,219 B2 | 11/2007 | Green et al. | |
| 7,305,610 B1 | 12/2007 | Dean et al. | |
| 7,308,643 B1 | 12/2007 | Zhu et al. | |
| 7,328,401 B2 | 2/2008 | Obata et al. | |
| 7,509,315 B1 * | 3/2009 | Alpert et al. | 1/1 |
| 7,680,773 B1 | 3/2010 | Acharya et al. | |
| 2002/0023158 A1 | 2/2002 | Polizzi et al. | |
| 2002/0032740 A1 | 3/2002 | Stern et al. | |
| 2002/0052928 A1 | 5/2002 | Stern et al. | |
| 2002/0099602 A1 | 7/2002 | Moskowitz et al. | |
| 2004/0044962 A1 | 3/2004 | Green et al. | |
| 2004/0225642 A1 | 11/2004 | Squillante et al. | |

(Continued)

FOREIGN PATENT DOCUMENTS

WO 01/50320 A1 7/2001

(Continued)

OTHER PUBLICATIONS

Fetterly, et al., "A Large-Scale Study of the Evolution of Web Pages", WWW2003, May 20-24, 2003, 10 pages.

(Continued)

*Primary Examiner* — Cheryl Lewis

(57) ABSTRACT

Crawling pages is disclosed. Pages are crawled up to a target number of pages. Additional pages, that have an importance that is equal to or greater than an importance threshold, are crawled beyond the target number of pages. In some embodiments, pages having an importance less than an importance threshold are deleted.

58 Claims, 5 Drawing Sheets

U.S. PATENT DOCUMENTS

| | | | |
|---|---|---|---|
| 2004/0225644 | A1 | 11/2004 | Squillante et al. |
| 2005/0071766 | A1 | 3/2005 | Brill et al. |
| 2005/0192936 | A1 | 9/2005 | Meek et al. |
| 2006/0235858 | A1* | 10/2006 | Joshi et al. .................... 707/100 |
| 2006/0277175 | A1* | 12/2006 | Jiang et al. ........................ 707/5 |

FOREIGN PATENT DOCUMENTS

WO          01/86507 A1     11/2001

OTHER PUBLICATIONS

Wolf, et al., "Optimal Crawling Strategies for Web Search Engines", WWW2002, ACM, May 7-11, 2002, pp. 136-147.

Arasu, A., et al., "Searching the Web", ACM Transactions on Internet Technology, vol. 1, No. 1, Aug. 2001, pp. 2-43.

Shkapenyuk, V. et al., "Design and Implementation of a High Performance Distributed Web Crawler", Proceedings of the 18th International Conference on Data Engineering ICDE, 2002, 12 pages.

Hirai, J. et al., "WebBase: A Repository of Web Pages", System Iregration Technology Center, Toshiba Corp., retrieved on Oct. 22, 2009, 22 pages.

Douglis, F et al., "The AT&T Internet Difference Engine: Tracking and Viewing Changes on the Web", World Wide Web, vol. 1, No. 1, Jan. 1998, 29 pages.

Douglis, F. et al., "Rate of Change and Other Metrics: A Live Study of the World Wide Web", USENIX Symposium on Internet Technologies and Systems, Dec. 1997, 14 pages.

Brandman, O. et al., "Crawler-Friendly Web Servers", ACM Sigmetrics Performance Evaluation Review, vol. 28, Issue 2, Sep. 2000, 16 pages.

Brin, S. et al., "The Anatomy of a Large-Scale Hypertextual Web Search Engine", Computer Networks and ISDN Systems, vol. 30 , Issue 1-7, Apr. 1998, 20 pages.

Haveliwala, T H., "Topic-Sensitive PageRank", WWW2002, ACM, May 7-11, 2002, 10 pages.

Jeh, G. et al., "Scaling Personalized Web Search", Proceedings of the 12th international conference on International Worldwide Web Conferences, 2003, 35 pages.

Kamvar, S. D., et al., "Exploiting the Block Structure of the Web for Computing Page Rank", Stanford University Technical Report, 2003, 13 pages.

Ali, H. et al., "What Changed? Measuring Document Change in Web Crawling for Search Engines", International symposium on string processing and information retrieval SPIRE 2003, Oct. 8-10, 2003, pp. 28-42.

Suel, T. et al., "Odissea: A Peer to Peer: Architecture for Scalable Web Search and Information Retrieval", In 6th International Workshop on the Web and Databases WebMD, Jun. 12-13, 2003, 6 pages.

Baeza-Yates, Ricardo et al., "Balancing Volume, Quality and Freshness in Web Crawling", Soft Computing Systems—Design Management and Applications, 2002, 10 pages.

U.S. Appl. No. 11/113,819, filed Apr. 25, 2005, 22 pages.

U.S. Appl. No. 11/113,820, filed Apr. 25, 2005, 22 pages.

Non-Final Office Action for U.S. Appl. No. 11/113,819, mailed on Nov. 23, 2009, 18 pages.

Non-Final Office Action for U.S. Appl. No. 11/113,819, mailed on Sep. 7, 2007, 12 pages.

Final Office Action for U.S. Appl. No. 11/113,819, mailed on Jan. 23, 2008, 16 pages.

Non-Final Office Action for U.S. Appl. No. 11/113,819, mailed on Jun. 23, 2008, 15 pages.

Final Office Action for U.S. Appl. No. 11/113,819, mailed on Nov. 5, 2008, 20 pages.

Non-Final Office Action for U.S. Appl. No. 11/113,820, mailed on Mar. 8, 2010, 22 pages.

Non-Final Office Action for U.S. Appl. No. 11/113,820, mailed on Oct. 31, 2007, 14 pages.

Non-Final Office Action for U.S. Appl. No. 11/113,820, mailed on Sep. 3, 2008, 18 pages.

Final Office Action for U.S. Appl. No. 11/113,820, mailed on Apr. 14, 2009, 22 pages.

Final Office Action for U.S. Appl. No. 11/113,819, mailed Aug. 20, 2010, 19 pages.

Final Office Action for U.S. Appl. No. 11/113,820, mailed Sep. 3, 2010, 21 pages.

U.S. Appl. No. 13/032,578, filed Feb. 22, 2011, 19 pages.

* cited by examiner

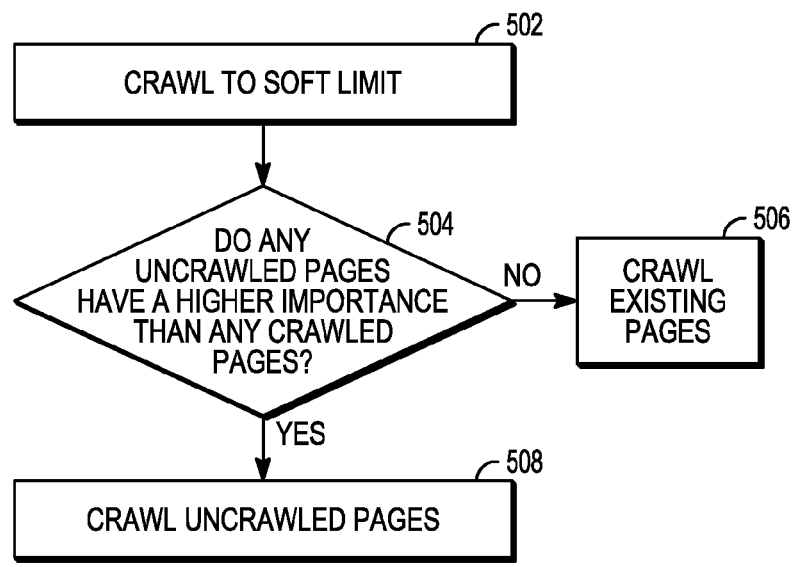

FIG. 5

| URL | IMPORTANCE |
|---|---|
| INTERNAL.COMPANY.COM/INDEX.HTML | 9 |
| INTERNAL.COMPANY.COM/IMPORTANT.DOC | 10 |
| INTERNAL.COMPANY.COM/ARCHIVE.TXT | 1 |
| ... | ... |
| INTERNAL.COMPANY.COM/USERS/JOHN/CAT.JPG | 1 |
| INTERNAL.COMPANY.COM/USERS/MARY/REPORT.DOC | 8 |
| INTERNAL.COMPANY.COM/IMAGES/LOGO.GIF | 10 |
| INTERNAL.COMPANY.COM/DOCS/PRINTING.HTML | 5 |
| NEWSERVER.COMPANY.COM/USERS/TED/REPORT.HTML | 7 |
| NEWSERVER.COMPANY.COM/USERS/JOSE/REPORT.PDF | 8 |
| NEWSERVER.COMPANY.COM/LICENSING/DRAFTS/VERSION1.TXT | 8 |
| NEWSERVER.COMPANY.COM/BACKUP/MAIL-LIST/1980.TGZ | 2 |
| ... | ... |

FIG. 6

MANAGING URLS

CROSS REFERENCE TO RELATED APPLICATIONS

This application is a continuation of U.S. patent application Ser. No. 11/166,786, filed Jun. 24, 2005, entitled "MANAGING URLS," now U.S. Pat. No. 7,509,315. U.S. patent application Ser. No. 11/166,786 is incorporated by reference herein in it entirety.

BACKGROUND OF THE INVENTION

Search appliances, such as are used in conjunction with an intranet, typically receive an initial list of URLs to crawl, crawl those URLs, and create an index based on the documents retrieved. As new URLs are encountered during the crawling process, they are typically added to the list of URLs to crawl and crawled accordingly. Search appliances typically can only maintain an index of a finite number of pages for a variety of reasons which may include resource and license limitations. It is possible that the search appliance may be aware of more URLs than it is capable of or authorized to index. In such a case, the search appliance may crawl to that limit and then stop, or continuously crawl the same pages, equal to the number of pages it may crawl. One result can be that less important pages that appear earlier in the URL list are crawled and newly discovered—and possibly more important pages—are not. There exists a need to be able to manage which URLs are crawled and indexed.

BRIEF DESCRIPTION OF THE DRAWINGS

Various embodiments of the invention are disclosed in the following detailed description and the accompanying drawings.

FIG. 5 illustrates an embodiment of a process for crawling documents.

FIG. 6 illustrates an embodiment of a table maintained by a search appliance.

DETAILED DESCRIPTION

Managing URLs is disclosed. A search appliance, such as the Google Search Appliance, is typically a self-contained computer which is installed within a network, such as a corporate intranet. The search appliance indexes documents on the intranet and delivers search results. As part of this process, documents are crawled and inserted into an index. A search appliance may be configured with a license limit such as 1,000,000 pages. The appliance is configured to crawl to the limit, and once it reaches the limit, to crawl new pages only if their importance is greater than or equal to an importance threshold. For example, if documents have an importance rank from 0-10, the importance threshold may be set at 7. Once the license limit is reached, the search appliance is instructed to only crawl additional documents that have an importance rank of 7 or higher. In some embodiments, pages are removed from the index based on their importance rank so that eventually, the index will contain approximately the top ranked 1,000,000 documents on the intranet.

Figure 1:
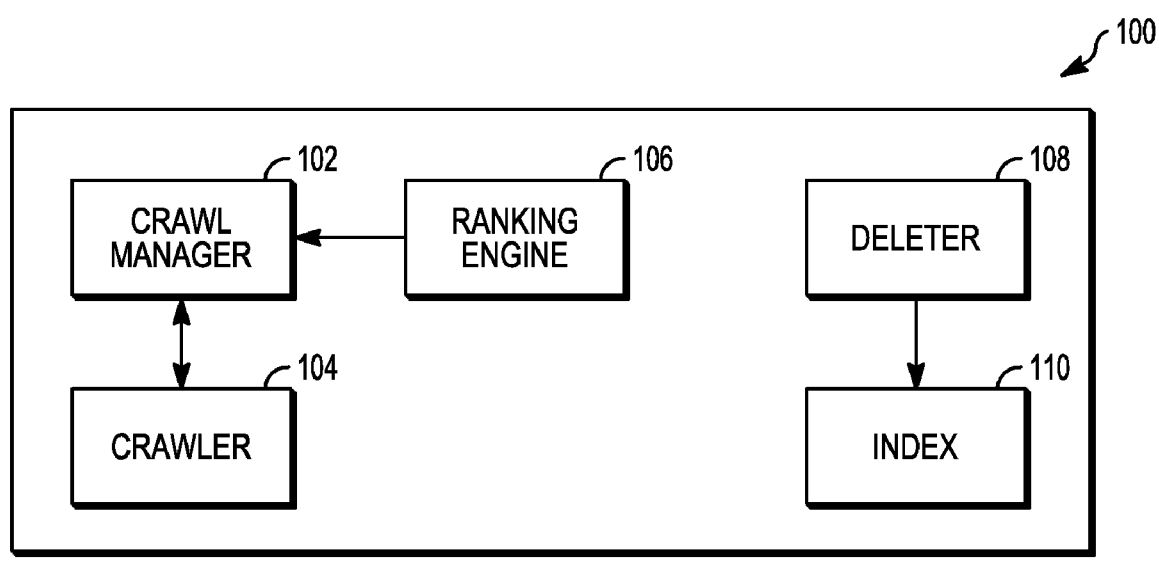
FIG. 1 illustrates an embodiment of a search appliance.

FIG. 1 illustrates an embodiment of a search appliance. In this example, search appliance 100 includes a crawl manager 102, a crawler 104, a ranking engine 106, a deleter 108, and an index 110. Other elements typically included in a search appliance, such as a repository, an indexer, and a search server, are not shown but may be included. In some embodiments, the functionality of multiple elements may be combined into a single element. For example, the functionality of deleter 108 may be implemented within crawl manager 102, and a separate deleter 108 is not needed. In some embodiments, the functionality of a single element may be implemented in multiple elements. For example, the functionality of crawl manager 102 may be split across several, smaller components.

As described more fully below, information is maintained about the URLs of which the search appliance is aware, including ranking information supplied by ranking engine 106. The information can be conceptualized as being stored in a table. The actual storage of the information may take any appropriate form. Also described below is a histogram of the importance ranks of documents believed to be stored in the index.

Crawl manager 102 selects and sends URLs to crawler 104 to crawl. In this embodiment, crawler 104 performs multiple functions, including requesting URLs from crawl manager 102, fetching the documents at those URLs, and processing retrieved documents, for example, to extract link information. Documents can include Web pages, text files, multimedia files, object features, link structure, and other content. In some embodiments, some of the functions of crawler 104 may be performed by other, separate components. As described more fully below, deleter 108 deletes low ranking pages from index 110.

Processes such as link extraction, ranking, and deleting can run asynchronously. In general these processes may be triggered by external events, such as a URL crawl finishing or starting, or may run wholly independently.

While the system depicted in FIG. 1 is a search appliance, the claimed invention could be practiced in a variety of information retrieval contexts. For example, intranet search engines, Internet search engines, and intrasite search engines may all replace the system of FIG. 1 or operate in conjunction with the system of FIG. 1.

Figure 2:
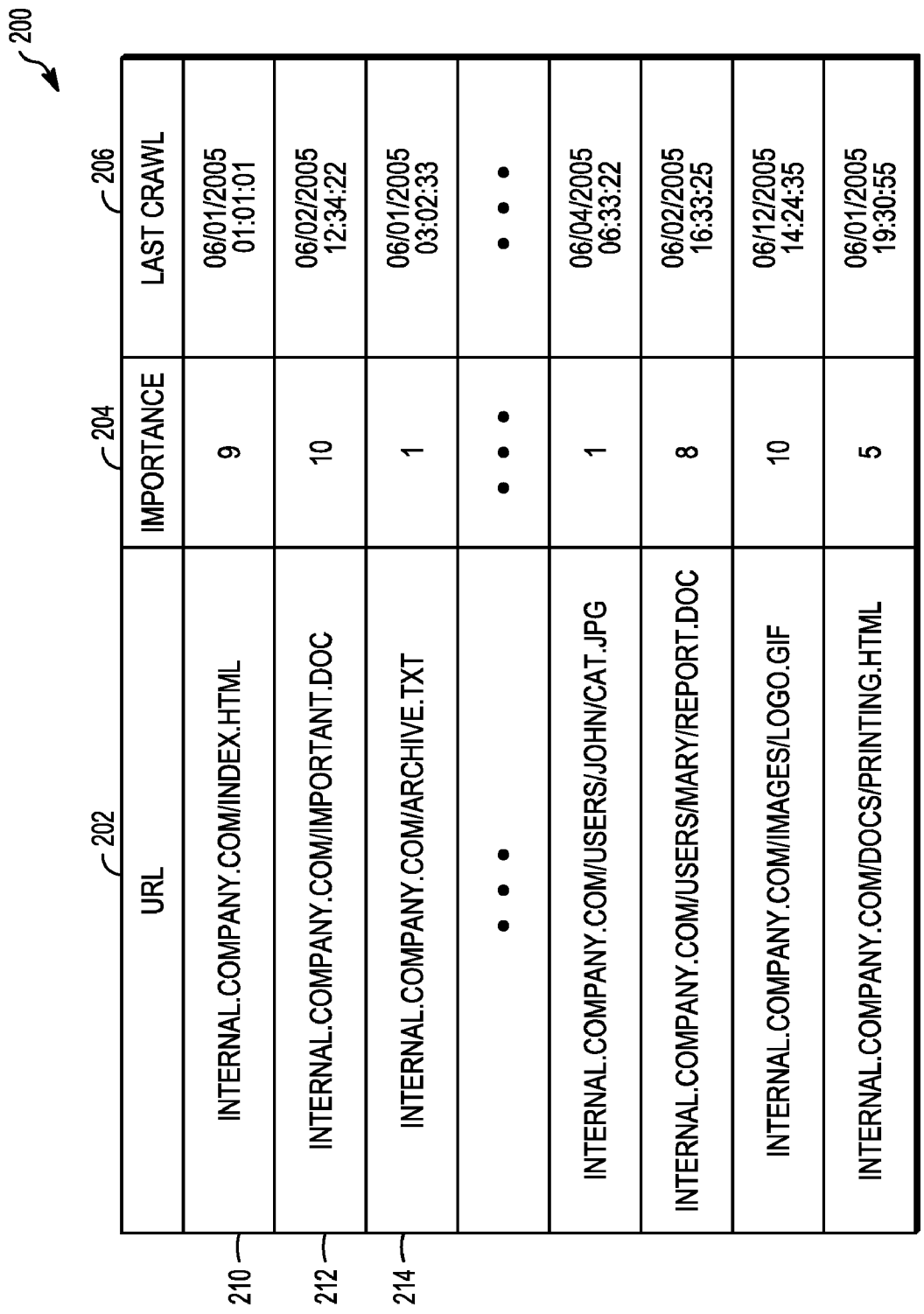
FIG. 2 illustrates an embodiment of a table maintained by a search appliance.

FIG. 2 illustrates an embodiment of a table maintained by a search appliance. The example table shown is a representation of some of the data contained in the table 200 used by search appliance 100. For each URL (202), an importance rank (204), and the time that the URL was last crawled (206) are stored. An importance rank is the relevance of a page independent of a query. In this example, the higher the value of the importance rank, the more important the page. Thus, URL 212 has a greater importance than URL 210, and both URLs have a significantly greater importance than URL 214. In some embodiments the importance rank is based on PageRank®. Any other appropriate ranking algorithm may be used. In this example, URL 210 has an importance rank of 9 and was last crawled on Jun. 1, 2005.

When a search appliance is first configured for use within an environment, such as a corporate intranet, an administrator may configure it with "start URLs," to be used as the initial crawl list. These pages may typically be top level documents, such as http://intranet.company.com, from which many other documents are linked. As the start URLs are crawled, additional documents, such as the linked pages, are discovered and their information is included in table 200. As described more fully below, table 200 may also be used by deleter 108.

Figure 3:
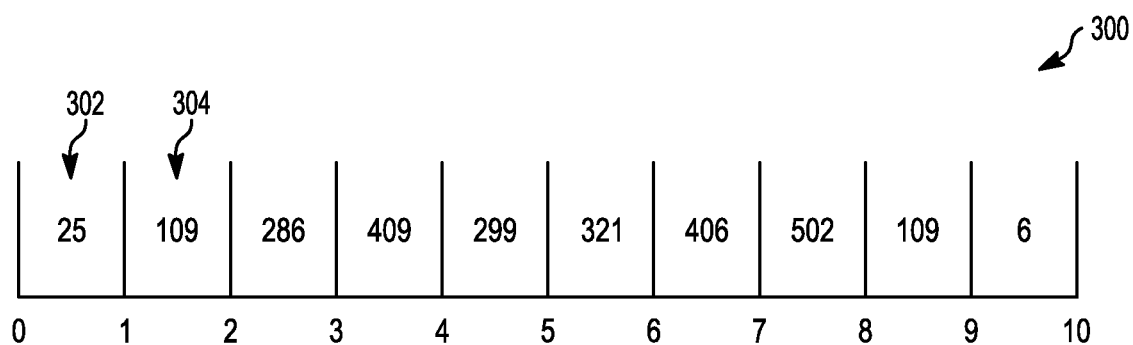
FIG. 3 illustrates an embodiment of a histogram maintained by a search appliance.

FIG. 3 illustrates an embodiment of a histogram maintained by a search appliance. In this example, the histogram is stored in memory and used by crawl manager 102. In some embodiments, the histogram is maintained other ways, such as in a file.

Histogram 300 depicts the importance rank of all URLs currently listed in index 110. In this example, histogram 300 is updated continuously by ranking engine 106. In other cases, histogram 300 can be computed as needed, and is generally an inexpensive computation.

In this example, pages have an importance between 0 and 10, inclusive. Bucket 302 is the number of known pages with a score between 0 and 1, inclusive. Bucket 304 is the number of known pages with a score greater than 1 and less than or equal to 2, and so on. In some embodiments, different buckets are used. For example, if using PageRank® for the importance of a page, several thousand buckets may be employed by histogram 300. In the example shown, index 110 currently contains 2472 URLs.

As new pages are added to index 110, their importance ranks are included in the histogram. In this example, the importance rank of each page is frequently calculated or updated as appropriate. Thus, from time to time, the rank of a page already existing in the histogram may change. For example, suppose a "Coming Soon" page (having an importance rank of 0.1) has been replaced with actual content (and now has an importance rank of 1.9). Ranking engine 106 will reduce the count of bucket 302 by one and increase the count of bucket 304 by one, accordingly.

Figure 4:
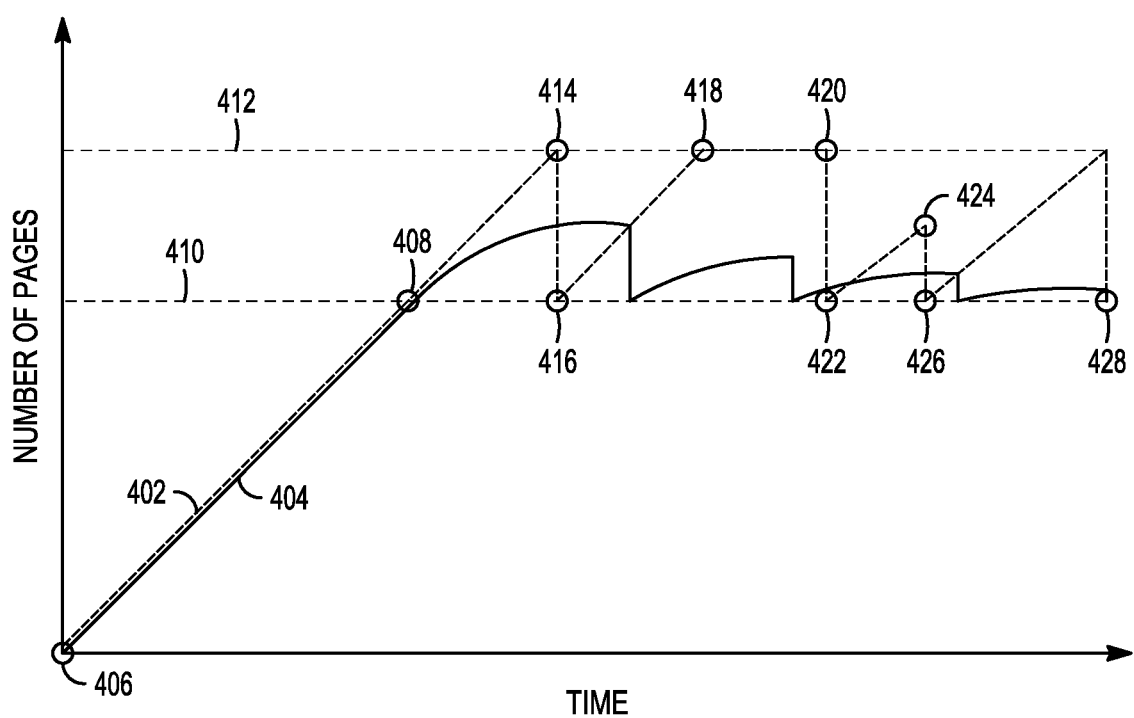
FIG. 4 illustrates an example of the number of documents in an index in one embodiment.

FIG. 4 illustrates an example of the number of documents in an index in one embodiment. Solid line 404 is a representation of the number of documents in an index over time when the processing of FIG. 5 is applied. Dotted line 402 is provided as an example representation of the number of documents in an index over time in a system where the processing of FIG. 5 is not applied. Lines 402 and 404 do not necessarily depict the same device. Before crawler 104 first begins crawling pages, index 110 is empty, as seen at point 406. As described more fully below, as crawler 104 crawls pages, they are added to index 110.

In this example, search appliance 100 makes use of two limits—a soft limit, also referred to herein as a "target limit" (for example, 1,000,000 indexed pages) and a hard limit (for example, 1,300,000 indexed pages). In some cases, the soft limit is a license limit. For example, search appliance 100 may retail at different prices depending on how large its license limit is. In some cases, the soft limit is based on a user configuration, or set automatically, such as based on available resources. Other limits may be configured as applicable.

Line 410 represents a soft limit of pages to be stored in index 110. In this example, soft limit 410 is a license limit of 1 million pages.

Regardless of whether the processing of FIG. 5 is applied, crawler 104 continues to crawl pages until the number of pages stored in index 110 equals the soft limit (at point 408). This is depicted by the segments between points 406 and 408 (hereinafter denoted "segment 406-408"), which have been drawn at a slight offset so that both lines may be seen. At point 408, index 100 contains 1,000,000 pages.

Line 412 represents a hard limit of pages to be stored in index 110. In this example, hard limit 412 is 130% of the soft limit (1,300,000 pages).

Without the processing of FIG. 5 in place, crawler 104 continues to crawl pages until hard limit 412 is reached, at which point the crawler stops (414). If pages are deleted from the index (segment 414-416), such as by deleter 108, crawler 104 resumes crawling (segment 416-418). Segment 418-420 illustrates the situation where the deletion process does not delete pages immediately after the hard limit has been reached. Crawler 104 will not crawl any new pages until some pages in the index have been removed (422). Segment 424-426 illustrates the situation where the deletion process deletes pages before the hard limit has been reached. In this case, the number of pages in index 110 was between the soft and hard limits when deletion occurred. As seen in FIG. 4, dotted line 402 exhibits significant oscillations. In some cases, the oscillations may result in the crawler repeatedly recrawling low ranking pages as they are deleted from the index.

FIG. 5 illustrates an embodiment of a process for crawling documents. In the example shown, the process begins at 502 when a crawl manager, such as crawl manager 102, instructs a crawler, such as crawler 104, to begin crawling pages. In FIG. 4, this portion of the process corresponds with point 406.

Crawler 104 continues to crawl documents until the number of documents contained in index 110 equals the soft limit. In FIG. 4, this portion of the process corresponds with solid line segment 406-408.

Once the soft limit is reached, at 504 (point 408 of FIG. 4) it is determined whether any uncrawled pages (e.g., pages in table 200 but not in index 110) have a greater importance rank than pages currently in index 110. Multiple methods could be employed to perform this determination.

In some embodiments, pages in table 200 are ordered in memory according to their importance rank. Once the soft limit is reached, the lowest ranking document in the index is determined and replaced by a new document if it is determined that the new document's importance rank is higher than the lowest ranking document in the index. In this case, a separate deleter 108 is not used. This method may typically require large amounts of memory and numbers of operations, and may prevent the use of other crawling priorities when determining when to crawl a particular page, such as the frequency with which the content on the page changes.

In some embodiments, the determination is made by calculating an importance threshold based at least in part on an importance rank histogram, such as histogram 300. New documents are only crawled at 508 if they have an importance ranking equal to or greater than the importance threshold.

Crawl manager 102 is typically aware of, via table 200, more pages than it will direct crawler 104 to crawl at any given time. Through table 200, crawl manager 102 knows the importance ranks of those pages, even if it doesn't know their content, for example, by having not crawled them before. Thus, crawl manager 102 typically knows the importance of uncrawled pages relative to pages already crawled.

In this example, the calculation performed at 504 can be analogized to computing whether a student is in the top third of a class. One method is to create a sorted list of all students and their grade point averages and check to see whether the particular student is in the top third of the list. Another method is to create a histogram of all grade point averages, determine that an arbitrary student in the top third has a grade point average of 3.2 or higher, and check whether a particular student's grade point average is equal to or greater than 3.2.

Suppose a search appliance has a license limit of 2,000 pages and a histogram 300 as shown in FIG. 3. In this case, index 110 contains 2,472 documents. The number of documents in each bucket is summed from right to left until the soft limit is reached. If the importance threshold is set to 4, 1,643 documents are above the importance threshold. If the importance threshold is set to 3, 2,052 documents are above the importance threshold. Thus, in this example, once the soft limit has been reached, pages having an importance rank of 4 or more will be crawled. Other methods of determining a ranking threshold may be employed as applicable.

In this example, the importance rank of each page is frequently calculated by ranking engine 106 and updated as appropriate. A page previously beneath the importance threshold may subsequently have an importance rank above the importance threshold, for example, based on changes to its content by a user.

If it is determined at 504 that no uncrawled documents have an importance rank above the importance threshold, existing pages are recrawled. The particular order in which crawled pages will be recrawled and uncrawled pages will be crawled can be specified in a variety of ways, including by using the scheduling processes described in U.S. patent application Ser. No. 11/113,819, entitled SCHEDULING A RECRAWL filed Apr. 25, 2005, and U.S. patent application Ser. No. 11/113,820, entitled MANAGING ITEMS IN CRAWL SCHEDULE filed Apr. 25, 2005, both of which are incorporated herein by reference for all purposes.

A search appliance employing FIG. 5 processing may continue to exhibit oscillations in the number of pages stored in index 110. This can be the case, for example, if there is a high ratio of uncrawled to crawled pages. However, as the solid segment 408-428 of FIG. 4 illustrates, oscillations of the number of pages in index 110 will eventually dampen and the crawling process will reach a steady state where the number of crawled documents is very close to the configured limit.

FIG. 6 illustrates an embodiment of a table maintained by a search appliance. The example table shown is a representation of some of the data contained in the table 200 used by search appliance 100, which has a license limit of 500,000 pages.

In some cases, dramatic changes may be made to table 200 after crawler 104 begins crawling pages. For example, an administrator may direct the search appliance to crawl a second domain in addition to a first domain. If this occurs after the license limit has been reached, a significant amount of pages may need to be removed from the index so that the highest ranking documents across both servers can be included in the index.

In the example shown, an administrator originally provided search appliance 100 with a start list of URLs 602-606. These URLs are all located on the same server, internal.company.com, which contains approximately 1 million pages. Over time, other pages 608-614, also all on internal.company.com, were discovered and crawled. Eventually, index 110 is updated to include pages having an importance of 5 or greater. Thus, URLs 602, 604, 610, 612, and 614 are stored in the index and URLs 606 and 608 are not, because their importance rank is too low.

The administrator subsequently directs search appliance 100 to index newserver.company.com in addition to internal.company.com. Newserver.company.com also contains approximately 1 million pages. As a result, table 200 is updated to contain 2,000,000 pages. In this example, it is possible that 50% or more of the documents currently in index 110 may need to be removed to make room for newly discovered high ranking pages of newserver.company.com, while still maintaining a license limit of 500,000 pages.

When the processing of FIG. 5 is applied after the search appliance is instructed to crawl newserver.company.com, the importance threshold is determined to be 8 instead of 5. As a result, pages 602, 604, 610, and 612 will remain in the index, page 614 will be removed from the index, and pages 622 and 624 will be added to the index.

Figure 7:
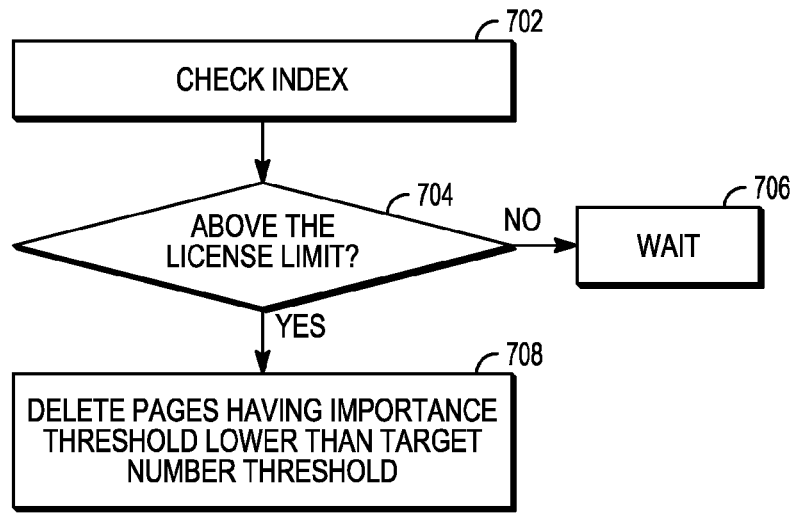
FIG. 7 illustrates an embodiment of a process for removing documents from an index.

FIG. 7 illustrates an embodiment of a process for removing documents from an index. As explained above, in some embodiments, a separate deletion process is not used, for example, when the importance ranks of individual pages are compared against each other. In that case, the search appliance may not contain a deleter 108.

In the example shown, the process begins at 702 when deleter 108 examines index 110. At 704, it is determined whether the index is above a limit, such as a license limit. If not, at 706, deleter 108 waits an appropriate amount of time and checks index (702) again later.

If the number of documents in index 110 exceeds the license limit, at 708 deleter 108 determines an appropriate number of pages to delete from the index and removes them. Multiple methods can be employed to perform this determination.

In some embodiments, pages in table 200 are ordered in memory according to their importance rank. In that case, deleter 108 deletes any documents in index 110 that are not also in the top 500,000-ranked pages. This method may typically require large amounts of memory and numbers of operations.

In some embodiments, the determination is made by calculating an unimportance threshold based at least in part on an importance rank histogram, such as histogram 300. Documents are removed from index 110 if they have an importance ranking less than an unimportance threshold.

In some cases, the unimportance threshold is equal to the importance threshold used by crawl manager 102. For example, suppose a search appliance has a license limit of 2,000 pages and a histogram 300 as shown in FIG. 3. In this case, index 110 contains 2,472 documents. The number of documents in each bucket is summed from right to left until the soft limit is reached. In this example, 1,643 documents are above an importance threshold of 4, meaning also that 829 pages are below an unimportance threshold of 4. Documents having an unimportance threshold less than 4 will thus be deleted by deleter 108.

Other methods of determining a ranking threshold may be employed as applicable. As described more fully below, in some cases, the importance threshold and unimportance threshold are set to different values.

Figure 8:
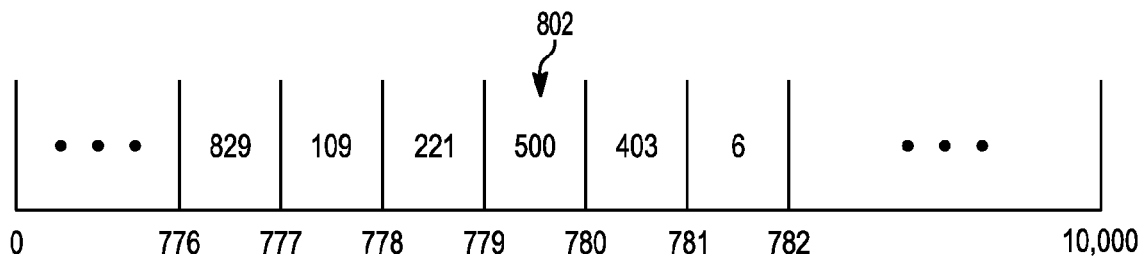
FIG. 8 illustrates an embodiment of a histogram maintained by a search appliance.

FIG. 8 illustrates an embodiment of a histogram maintained by a search appliance. The example shown is a representation of some of the data contained in a histogram 800 used by crawl manager 102 and deleter 108. Here, a ranking from 0-10,000 is employed.

In some implementations, the ranking information relied on by crawl manager 102 and deleter 108 may get out of sync. This can occur, for example, if crawl manager 102 and deleter 108 obtain their ranking information from different sources, such as different files, which aren't updated at precisely the same time by ranking engine 106.

In the example shown, crawl manager 102 believes that the importance threshold should be set at 779. Deleter 108, slightly out of sync, using the same calculation as crawl manager 102, but different data, believes the unimportance threshold should be set at 780. Because the unimportance threshold is higher than the importance threshold, the deleter will delete documents in the same area that is being crawled. In this example, 500 documents (documents in bucket 802) will be deleted by deleter 108, then crawled again by crawler 104, then deleted by deleter 108, and so on.

As the data used by crawl manager 102 and deleter 108 is synchronized, this problem typically goes away. However, it can also be mitigated by intentionally setting the unimportance threshold to a value lower than the importance threshold. In this example, by setting the unimportance threshold to 776, a buffer is created so that regardless of whether the crawl manager 102 and deleter 108 are in sync, documents near the importance threshold won't be needlessly removed and recrawled.

Although the foregoing embodiments have been described in some detail for purposes of clarity of understanding, the invention is not limited to the details provided. There are many alternative ways of implementing the invention. The disclosed embodiments are illustrative and not restrictive.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. While the invention is described in conjunction with a search appliance, the invention may be embodied in a web search engine, such as Google.com, and in other information retrieval systems. In general, the order of the steps of disclosed processes may be altered within the scope of the invention.

A detailed description of one or more embodiments of the invention has been provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:

1. A system comprising:
    a processor, coupled to a memory, configured to:
        check an index of crawled items for a number of index entries in the index, wherein the index entries include references to the crawled items; and
        when the number of index entries is equal to or greater than a target number, select one or more of the index entries for deletion from the index based on an importance of the crawled items referenced by the index entries.

2. The system of claim 1 wherein the selection of index entries selected for deletion from the index is based on the crawled items referenced by the selected index entries having an importance that is less than an unimportance threshold.

3. The system of claim 2 wherein the processor is further configured to:
    calculate the unimportance threshold based at least in part on a histogram of a number of crawled items referenced by the index entries having various different importances.

4. The system of claim 2 wherein the unimportance threshold is set to a value lower than an importance threshold that is used to determine whether an item is to be crawled for inclusion in an index entry in the index.

5. The system of claim 1 wherein the target number is based on a license limit that governs a number of index entries in the index according to terms of the license.

6. The system of claim 1 wherein the processor is further configured to:
    delete the selected index entries from the index; and
    crawl additional items that have an importance that is equal to or greater than an importance threshold.

7. The system of claim 1, further comprising a ranking engine configured to assign an importance to items.

8. The system of claim 1, wherein an importance of an item is a query-independent metric associated with an importance of the item.

9. The system of claim 1, wherein the importance of an item is independent of a time the item was last accessed.

10. The system of claim 1, wherein the importance of an item is independent of a time the item was last crawled.

11. The system of claim 1, wherein the crawled items include documents.

12. The system of claim 1, wherein the crawled items include webpages.

13. The system of claim 1, wherein the crawled items include text files.

14. The system of claim 1, wherein the crawled items include multimedia files.

15. The system of claim 1, wherein the crawled items include items accessible within an intranet.

16. A recordable storage medium having recorded and stored thereon instructions that, when executed, perform the actions of:
    crawling items until a specified number of items is crawled; and
    when the specified number of items is crawled, crawling additional items only if the additional items comprise a designated criterion.

17. The recordable storage medium of claim 16 wherein the designated criterion comprises an importance that is equal to or greater than an importance threshold that is used to determine whether an item is to be crawled for inclusion in an index entry in the index, wherein an importance of an item is a query-independent metric associated with an importance of the item.

18. The recordable storage medium of claim 16 wherein the specified number is based on a license limit that governs a number of index entries in the index according to terms of the license.

19. The recordable storage medium of claim 16 wherein crawling additional items includes crawling the additional items until another specified number of items is crawled.

20. A method of crawling items, the method comprising:
    crawling, using a processor of one or more devices, items until a specified number of items is crawled; and
    when the specified number of items is crawled, crawling, using a processor of the one or more devices, additional items only if the additional items comprise a designated criterion.

21. The method of claim 20 wherein the designated criterion comprises an importance that is equal to or greater than an importance threshold that is used to determine whether an item is to be crawled for inclusion in an index entry in the index, wherein an importance of an item is a query-independent metric associated with an importance of the item.

22. The method of claim 20 wherein the specified number is based on a license limit that governs a number of index entries in the index according to terms of the license.

23. The method of claim 20 wherein crawling additional items comprises crawling, using a processor of the one or more devices, the additional items until another specified number of items is crawled.

24. A system comprising:
a processor, coupled to a memory, configured to:
crawl items until a specified number of items is crawled; and
when the specified number of items is crawled, crawl additional items only if the additional items comprise a designated criterion.

25. The system of claim 24 wherein the designated criterion comprises an importance that is equal to or greater than an importance threshold that is used to determine whether an item is to be crawled for inclusion in an index entry in the index, wherein an importance of an item is a query-independent metric associated with an importance of the item.

26. The system of claim 24 wherein the specified number is based on a license limit that governs a number of index entries in the index according to terms of the license.

27. The system of claim 24 wherein crawling additional items includes crawling the additional items until another specified number of items is crawled.

28. A recordable storage medium having recorded and stored thereon instructions that, when executed, perform the actions of:
checking an index of crawled items for a number of index entries in the index, wherein the index entries include references to the crawled items; and
when the number of index entries is equal to or greater than a target number, selecting one or more of the index entries for deletion from the index based on an importance of the crawled items referenced by the index entries.

29. The recordable storage medium of claim 28 wherein the selection of index entries selected for deletion from the index is based on the crawled items referenced by the selected index entries having an importance that is less than an unimportance threshold.

30. The recordable storage medium of claim 29 further comprising instructions that, when executed, perform the action of calculating the unimportance threshold based at least in part on a histogram of a number of crawled items referenced by the index entries having various different importances.

31. The recordable storage medium of claim 29 wherein the unimportance threshold is set to a value lower than an importance threshold that is used to determine whether an item is to be crawled for inclusion in an index entry in the index.

32. The recordable storage medium of claim 28 wherein the target number is based on a license limit that governs a number of index entries in the index according to terms of the license.

33. The recordable storage medium of claim 28 further comprising instructions that, when executed, perform the actions of:
deleting the selected index entries from the index; and
crawling additional items that have an importance that is equal to or greater than an importance threshold.

34. The recordable storage medium of claim 28, further comprising instructions that, when executed, perform the action of assigning an importance to items.

35. The recordable storage medium of claim 28, wherein the importance of an item is a query-independent metric associated with an importance of the item.

36. The recordable storage medium of claim 28, wherein the importance of an item is independent of a time the item was last accessed.

37. The recordable storage medium of claim 28, wherein the importance of an item is independent of a time the item was last crawled.

38. The recordable storage medium of claim 28, wherein the crawled items include documents.

39. The recordable storage medium of claim 28, wherein the crawled items include webpages.

40. The recordable storage medium of claim 28, wherein the crawled items include text files.

41. The recordable storage medium of claim 28, wherein the crawled items include multimedia files.

42. The recordable storage medium of claim 28, wherein the crawled items include items accessible within an intranet.

43. A method, comprising:
checking, using a processor of one or more devices, an index of crawled items for a number of index entries in the index, wherein the index entries include references to the crawled items; and
when the number of index entries is equal to or greater than a target number, selecting, using a processor of the one or more devices, one or more of the index entries for deletion from the index based on an importance of the crawled items referenced by the index entries.

44. The method of claim 43 wherein the selection of index entries selected for deletion from the index is based on the crawled items referenced by the selected index entries having an importance that is less than an unimportance threshold.

45. The method of claim 44 further comprising calculating the unimportance threshold based at least in part on a histogram of a number of crawled items referenced by the index entries having various different importances.

46. The method of claim 44 wherein the unimportance threshold is set to a value lower than an importance threshold that is used to determine whether an item is to be crawled for inclusion in an index entry in the index.

47. The method of claim 43 wherein the target number is based on a license limit that governs a number of index entries in the index according to terms of the license.

48. The method of claim 43 further comprising:
deleting, using a processor of the one or more devices, the selected index entries from the index; and
crawling, using a processor of the one or more devices, additional items that have an importance that is equal to or greater than an importance threshold.

49. The method of claim 43, further comprising assigning an importance to items.

50. The method of claim 43, wherein the importance of an item is a query-independent metric associated with an importance of the item.

51. The method of claim 43, wherein the importance of an item is independent of a time the item was last accessed.

52. The method of claim 43, wherein the importance of an item is independent of a time the item was last crawled.

53. The method of claim 43, wherein the crawled items include documents.

54. The method of claim 43, wherein the crawled items include webpages.

55. The method of claim 43, wherein the crawled items include text files.

56. The method of claim 43, wherein the crawled items include multimedia files.

57. The method of claim 43, wherein the crawled items include items accessible within an intranet.

58. A method comprising:

crawling items up to a target number of items, wherein at least a subset of the crawled items are not constrained to have an importance;

crawling additional items in the collection beyond the target number of items, wherein the additional items are constrained to have an importance that is equal to or greater than an importance threshold;

providing, in an index, for each of at least a subset of the crawled items and the additional crawled items crawl data associated with the respective item;

checking the index for a number of index entries in the index, wherein the index entries include references to the crawled items; and selecting, when the number of index entries is equal to or greater than a target number, one or more of the index entries for deletion from the index based on an importance of the crawled items referenced by the index entries.

* * * * *